United States Patent [19]

Hancock

[11] 3,916,161

[45] Oct. 28, 1975

[54] HEXIDECIMAL TO BINARY CONVERSION DEVICE

[75] Inventor: William C. Hancock, Bridgewater, N.J.

[73] Assignee: The United States of America as represented by the Secretary of the Army, Washington, D.C.

[22] Filed: Mar. 12, 1974

[21] Appl. No.: 450,544

[52] U.S. Cl. ................ 235/69; 235/89 R; 235/85 R
[51] Int. Cl. ........................ G06c 17/00; G06c 27/00
[58] Field of Search ............ 235/89, 69, 70 R, 85 R; 35/30; 116/114 R

[56] References Cited

UNITED STATES PATENTS

| | | | |
|---|---|---|---|
| 1,892,634 | 12/1932 | Rubinsky | 235/69 |
| 2,298,730 | 10/1942 | Alvari | 235/89 R |
| 3,352,031 | 11/1967 | Lindquist | 235/85 R |
| 3,386,653 | 6/1968 | Phipps | 235/70 R |
| 3,604,620 | 9/1971 | Rakes | 235/69 |
| 3,722,110 | 3/1973 | Morrisey et al. | 35/30 |

*Primary Examiner*—Stephen J. Tomsky
*Attorney, Agent, or Firm*—Lawrence A. Neureither; Jack W. Voigt; Robert C. Sims

[57] ABSTRACT

A plurality of conversion slides are positioned moveably in a holder. The holder has slots whereby the hexidecimal number can be read from the slide and its equivalent binary number may be read below. A plurality of slide push pins are fixed to the slides and positioned in the holder such that the slides may be moved to select a desired number to be converted.

1 Claim, 3 Drawing Figures

HEXIDECIMAL TO BINARY CONVERSION DEVICE

SUMMARY OF THE INVENTION

This invention consists of a holder having a front plate and a rear plate spaced apart by spacers. The plurality of slides having conversion charts printed thereon are fitted in the space between the front and rear plates and are kept separated by guides. The front plate of the holder has two viewing slots and a slide slot. Through the viewing slot the numbers printed on the slide are viewed two at a time. The top viewing slot shows a number which is to be converted, and the bottom viewing slot shows the binary equivalent of said number. In order that different numbers may be selected by the slides to be viewed through the viewing slots, push pins are positioned through the slides and out the front of the holder through the slide slot.

DESCRIPTION OF THE PREFERRED EMBODIMENT

Figure 1:
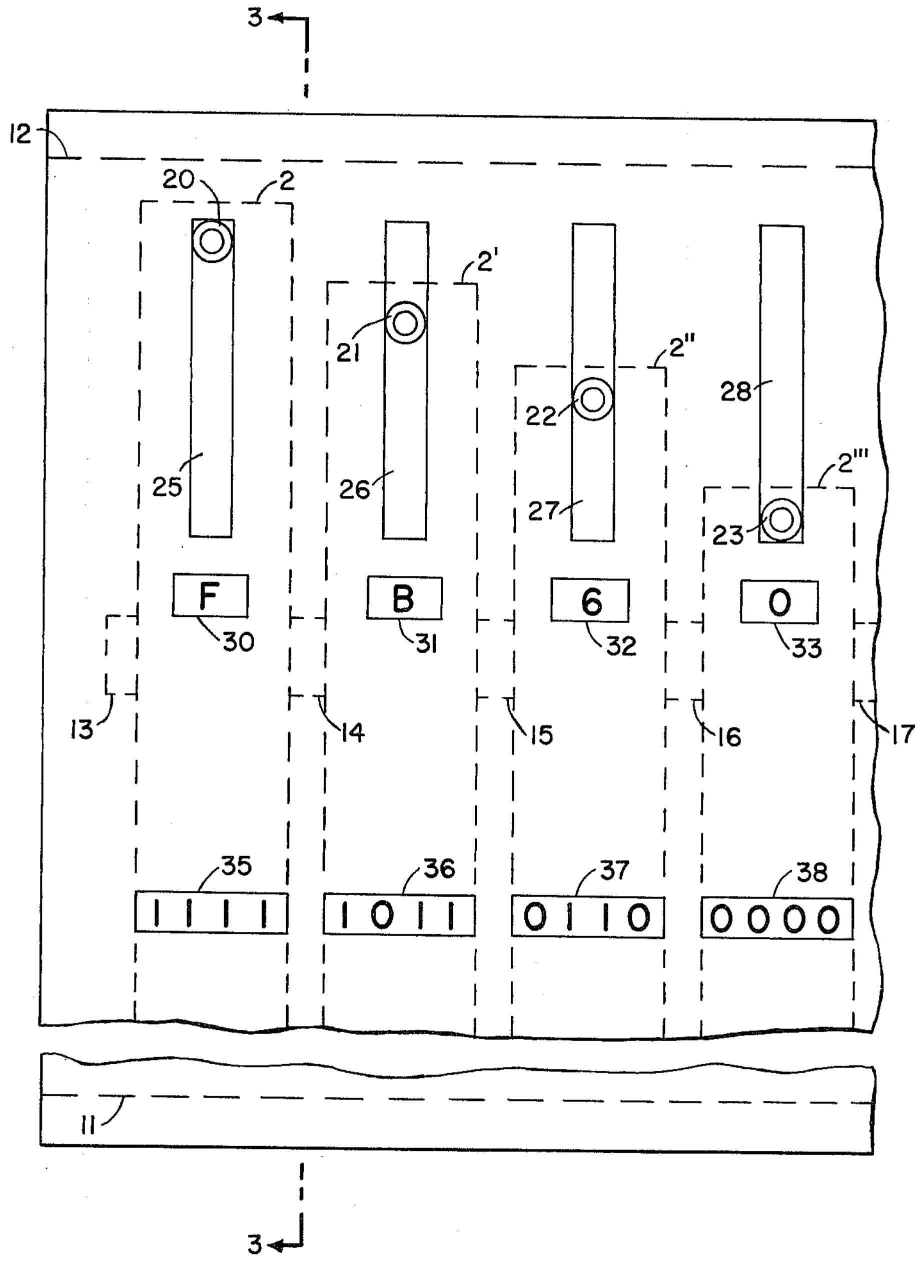
FIG. 1 shows a front view of the conversion device of the present invention.
Figure 2:
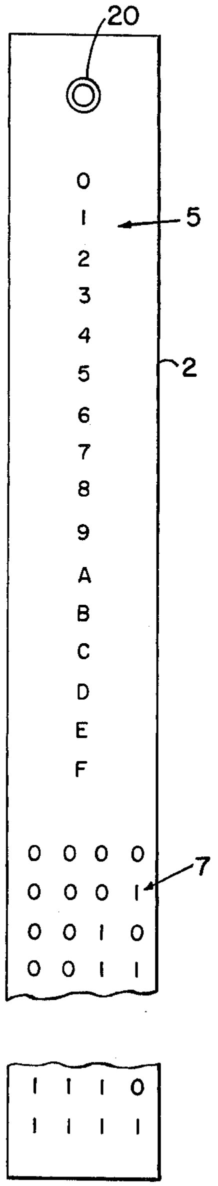
FIG. 2 shows a front view of a slide.

The purpose of this invention is to convert hexidecimal computer words into binary form quickly. FIG. 1 shows the conversion device in which slides shown in FIG. 2 are inserted. The slides are identical to each other and have printed on them hexidecimal numbers 5 and binary numbers 7. Both sets of numbers are equally spaced from each other and start from zero and go through consecutively to their highest number.

Figure 3:
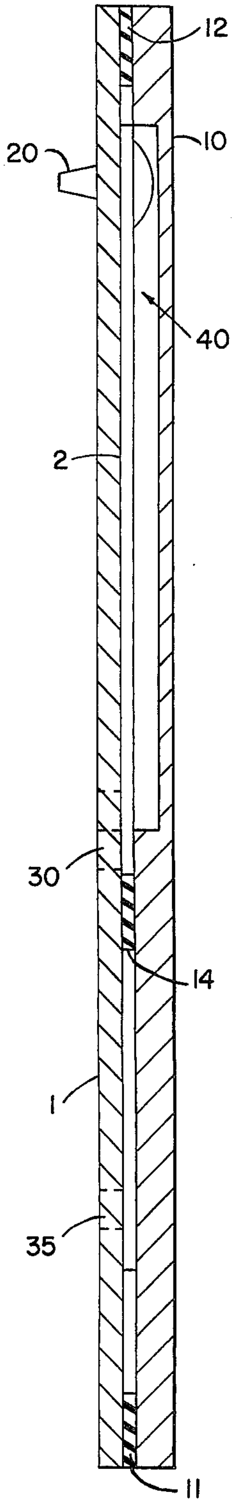
FIG. 3 shows a cutaway side view of the present invention taken along lines 3—3 of FIG. 1.

FIG. 3 shows that the slide 2 is captured between a front plate 1 and a back plate 10 of the holder. The slide has room for movement within the space provided by spacers 11 and 12. Spacers 11 and 12 extend the full width of the holder shown in FIG. 1. The spacers are joined to the plates to provide structural support. Slide 2 is positioned within the holder by guides 13 and 14. Other guides 15-17 shown in FIG. 3 are provided for guiding slides 2′, 2″, and 2‴.

Slide push pins 20–23 protrude through the front plate 1 via guide slots 25–28. When the slide guide pins are moved to various positions in the guide slots, the slides 2–2‴ are constrained to move with them. As a result desired hexidecimal numbers 5 can be positioned within viewing slots 30–33. At the same time, since a fixed relative distance is maintained between the appropriate hexidecimal number 5 and its equivalent binary number 7 on the same slide, the equivalent binary 7 will appear in the binary viewing slots 35–38.

The distance between viewing slots 30–33 and viewing slots 35–38 is equal to the distance on the slide between the zero number for 5 and the zero number for 7. This assures that the binary equivalent of the hexidecimal number positioned in viewing slots 30–33 will appear in viewing slots 35–38. Of course the conversion is a two way type conversion, in that the binary number may be selected and the hexidecimal number read out.

Although only four slides are shown in the preferred embodiment, any number of slots with appropriate slides may be provided between plates 1 and 10. The particular bit position of the binary and hexidecimal number may be printed on the front plate 1 of the holder below the appropriate viewing slots. In this way not only will a direct conversion from hexidecimal to binary be accomplished easily, also their orientations relative to the bit positions will also be easily readable.

The push pins 20–23 protrude through the slides 2–2‴ and are not moveable relative to the slides. The push pins have a flat head which is positioned on the back side of the sides. Plate 10 of the holder is constructed such that a further slot 40 is provided to accommodate the extra width of the head of the push pin. The dimensions of this slot will also be such that they act as stops for the slide so that the slide will not be pushed beyond the range of its conversion table.

I claim:

1. A device comprising a front plate; a rear plate; spacers fitted between said front plate and said rear plate such that a space is provided between said front and rear plates; and a plurality of guide means positioned in the space between the front and rear plates; a plurality of slide means positioned by said plurality of guide means in the space between the front and rear plates; a plurality of viewing slots positioned in said front plate; said spacers extend across the front and rear plates so as to provide structural support; a plurality of positioning means for moving said plurality of slide means; said plurality of positioning means comprises a plurality of guide slots; a plurality of pin means; said pin means being affixed to different slide means and positioned within different guide slots such that by movement of said pin said slide means may be moved relative to the viewing slots; each slide has printed thereon a consecutive number of numbers of one system spaced apart from each other by a constant predetermined distance and an equal number of numbers of a different system which are the equivalent of the numbers of the first system spaced apart by said same predetermined distance; the numbers of the first system are located vertically along the top half of the slot and the numbers of the second system are located vertically along the bottom half of the slot; said viewing slots being in number twice the number of slide means; said viewing slots being located in pairs spaced apart by a predetermined distance and located on the front plate such that one number of one system may be read from one viewing slot of the pair and another number of the second system is read in the other one of the pair of viewing slots; said first numbers of each of said first and second numbering systems being printed the same distance apart on said slide means as the distance apart the pairs of viewing slots are spaced apart; said plurality of pin means extend through said slide means and protrude out of the guide slot; said pin means having a head located on the side of the slide means opposite that of the front plate; and a space being provided in the rear plate so as to allow room for the head of the pin means, and provide stops for travel of said slide means.

* * * * *